United States Patent
Zaehring et al.

(10) Patent No.: US 10,108,889 B1
(45) Date of Patent: Oct. 23, 2018

(54) QUICK RESPONSE CODE WIDGET FOR TROUBLESHOOTING DATA

(71) Applicant: Rockwell Collins, Inc., Cedar Rapids, IA (US)

(72) Inventors: James M. Zaehring, Edmonds, WA (US); Travis J. Floyd, Snohomish, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/674,884

(22) Filed: Aug. 11, 2017

(51) Int. Cl.
G06K 19/06 (2006.01)
G06F 3/147 (2006.01)

(52) U.S. Cl.
CPC ........ G06K 19/06037 (2013.01); *G06F 3/147* (2013.01)

(58) Field of Classification Search
CPC ............ G06K 19/06; G06K 7/10; G06K 9/18; G06K 9/36; G06K 9/80; G06K 19/00; G06F 17/00
USPC .................. 235/494, 375, 462.09, 462.1, 487
See application file for complete search history.

(56) References Cited

U.S. PATENT DOCUMENTS

| | | | |
|---|---|---|---|
| 2006/0196950 A1* | 9/2006 | Kiliccote | G06K 7/14 235/494 |
| 2013/0032634 A1* | 2/2013 | McKirdy | A61B 5/0205 235/375 |
| 2013/0334313 A1* | 12/2013 | Ganesan | G06K 19/0614 235/462.04 |
| 2014/0079374 A1* | 3/2014 | Gehring | H04N 5/782 386/296 |
| 2014/0085309 A1* | 3/2014 | Czapar | G06F 3/147 345/441 |
| 2016/0189015 A1* | 6/2016 | Coulier | G06K 19/0614 235/462.1 |
| 2016/0357996 A1* | 12/2016 | Yamashita | G06K 15/022 |

* cited by examiner

*Primary Examiner* — Edwyn Labaze
(74) *Attorney, Agent, or Firm* — Angel N. Gerdzhikov; Donna P. Suchy; Daniel M. Barbieri

(57) ABSTRACT

A widget for displaying a quick response (QR) code is populated with state data pertinent to a system malfunction where the system does not otherwise have a viable method for supplying such data for analysis. The widget is generated and populated by a graphics server that complies with avionics certification standards. The widget allows multiple pages of data by either automatically repopulating the widget with a new QR code or accepting an input indicating the ability to continue.

14 Claims, 4 Drawing Sheets

QUICK RESPONSE CODE WIDGET FOR TROUBLESHOOTING DATA

BACKGROUND

Data-limited display issues and in flight errors are routinely difficult to reproduce, due to limited amounts of data available, difficulty correlating data to the display event, and lack of availability of instrumented buses and recorded data. In lab test, flight test, and production, gaining detailed troubleshooting data is difficult. Getting such data often requires custom specific test equipment. Troubleshooting such errors is time consuming and expensive, or even impossible.

Consequently, it would be advantageous if an apparatus existed that is suitable for supplying data in a visibly recordable format without secure data connections or allowing unsecure data connections.

SUMMARY

In one aspect, embodiments of the inventive concepts disclosed herein are directed to a widget for displaying a quick response (QR) code populated with data pertinent to a system that does not otherwise have a viable method for supplying such data for analysis. The widget may be generated and populated by a graphics server that complies with avionics certification standards.

In a further aspect, the widget allows multiple pages of data by either automatically repopulating the widget with a new QR code or accepting an input indicating the ability to continue.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
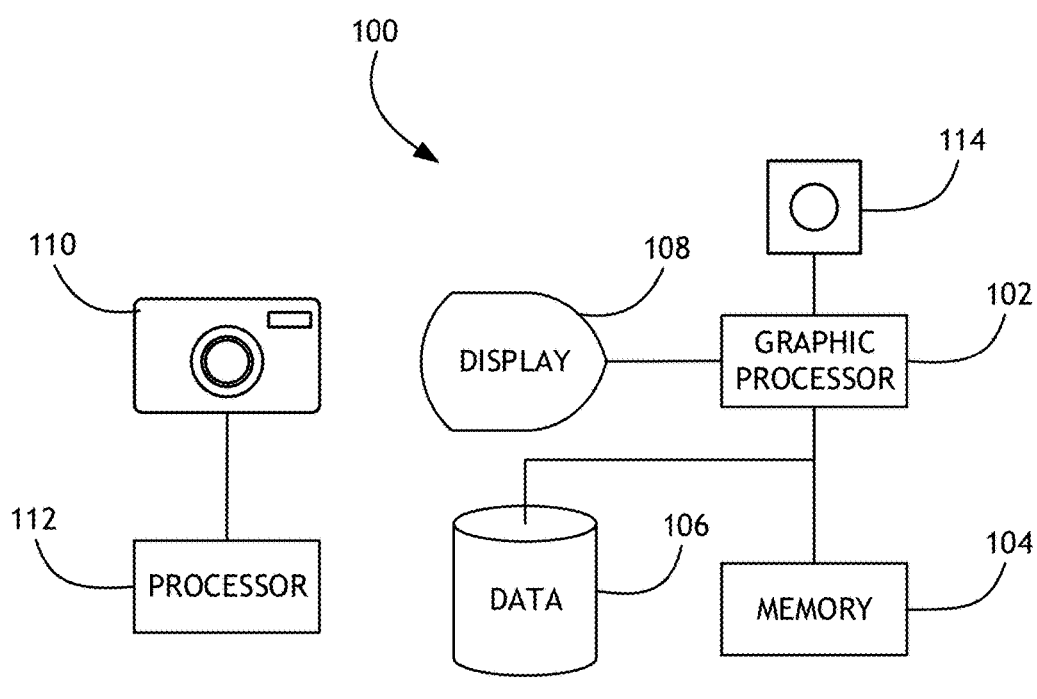
FIG. 1 shows a block diagram of an exemplary system for implementing embodiments of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a widget for displaying a QR code populated with data pertinent to a system that does not otherwise have a viable method for supplying such data for analysis.

Referring to FIG. 1, a block diagram of an exemplary system 100 for implementing embodiments of the inventive concepts disclosed herein is shown. The system 100 includes a processor 102, memory 104 connected to the processor 102, a data storage element 106 connected to the processor 102 containing streaming data or system state data associated with a current status of the system 100, and a display 108 connected to the processor 102.

In at least one embodiment, where the processor 102 identifies an error, the processor 102 generates a QR code including at least a portion of data associated with the error or system generating the error, and renders the QR code on the display 108. In at least one embodiment, the data may be encrypted before being converted to an otherwise unsecure QR code. A user records the QR code with a mobile device 110. The mobile device 110 may include a decoding processor 112 or be connected to a decoding processor 112 configured to decode the QR code and provide the recorded data without requiring a secure data connection to the processor 102 or data loaders.

In at least one embodiment, where the amount of data corresponding to the error exceeds the amount of data that can be encoded into a QR code, the processor 102 iteratively retrieves subsequent data chunks, generates, and renders a new QR code every time the processor 102 receives an input indicating that the current QR code has been recorded, or after a predetermined delay. It at least one embodiment, the predetermined delay may be a configurable delay based on features of the mobile device 110; for example, where the mobile device 110 is capable of recording a series of images at high speed, the configurable delay may be on the order of milliseconds. In at least one embodiment, where the system 100 includes a photo sensor 114 connected to the processor 102 for detecting sunlight in a cockpit, the processor 102 may detect a light signal such as a flash or modulated series of visible or invisible light pulses from the mobile device 110 via the photo sensor 114 indicating that the mobile device 110 has successfully recorded the QR code. When the last data chunk has been recorded, the processor 102 may remove the QR code from the display 108. Alternatively, where the processor 102 cycles QR codes based on a predetermined delay, the processor 102 may continually re-display the sequence of QR codes until the processor 102 receives an acknowledgement. In at least one embodiment, the processor 102 compresses the data before encryption and/or conversion to a QR code to maximize the amount of data represented by the QR code and reduce the number of QR codes necessary to transfer the data.

Figure 2:
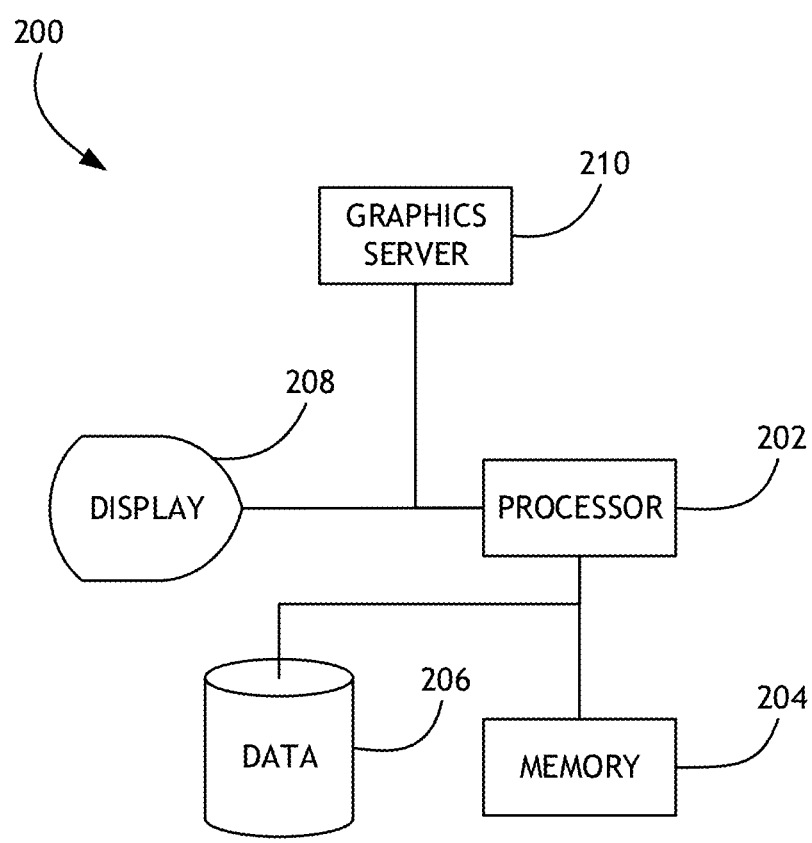
FIG. 2 shows a block diagram of an exemplary system for implementing embodiments of the inventive concepts disclosed herein.

Referring to FIG. 2, a block diagram of an exemplary system 200 for implementing embodiments of the inventive concepts disclosed herein is shown. The system 200 includes a processor 202, memory 204 connected to the processor 202, a data storage element 206 connected to the processor 202 containing streaming data or system state data associated with a current status of the system 200, and a display 208.

In at least one embodiment, the system 200 includes a graphics server 210, for example an ARINC 661 compliant graphics server, and the processor 202 may operate as a client of the graphics server 210. In at least one embodiment, the graphics server 210 is connected directly to the display 208; alternatively the graphics server 210 may be in data communication with the display 208 via the processor 202.

In at least one embodiment, where the processor 202 identifies an error, the processor 202 sends a request for a QR code widget to the graphics server 210. Alternatively, or in addition, elements rendered on the display 208 may each be associated with an input such that a user may select an element on the display. Selecting such input instructs the processor 202 to send a request to the graphics server 210 to generate a QR code widget to include a QR code of state data specifically associated with the display element or system corresponding to the display element, even where no error state has been detected.

The graphics server 210 generates a QR code widget for rendering on the display 208. Alternatively, or in addition, the graphics server 210 may produce the QR code or QR codes and store them until a user actively requests such codes, thereby preserving the data for later retrieval. The QR code widget may include inputs for adjusting the data density of a corresponding QR code and indicating that the QR code has been recorded and the QR code widget can be repopulated with a new QR code.

The graphics server 210 retrieves data, or requests data via the processor 202, corresponding to the system or system error. A QR code is generated including at least a portion of the data, and the QR code is rendered within the QR code widget.

In at least one embodiment, were a user determines that the data density of the QR code is either insufficient or too large to record in the actual working environment, the user may indicate a desire to change the data density of the QR code. The graphics server 210 regenerates the QR code with a new selected data density and repopulates the QR code widget.

In at least one embodiment, where the amount of data corresponding to the error exceeds the amount of data that can be encoded into a QR code of the desired data density, the graphics server 210 iteratively retrieves subsequent data chunks, generates a new QR code, and populates the QR code widget every time the QR code widget receives an input indicating that the current QR code has been recorded. When the graphics server 210 receives an input indicating that the last data chunk has been recorded, the graphics server 210 may depopulate the QR code widget and remove the QR code widget from the display 208.

Figure 3:
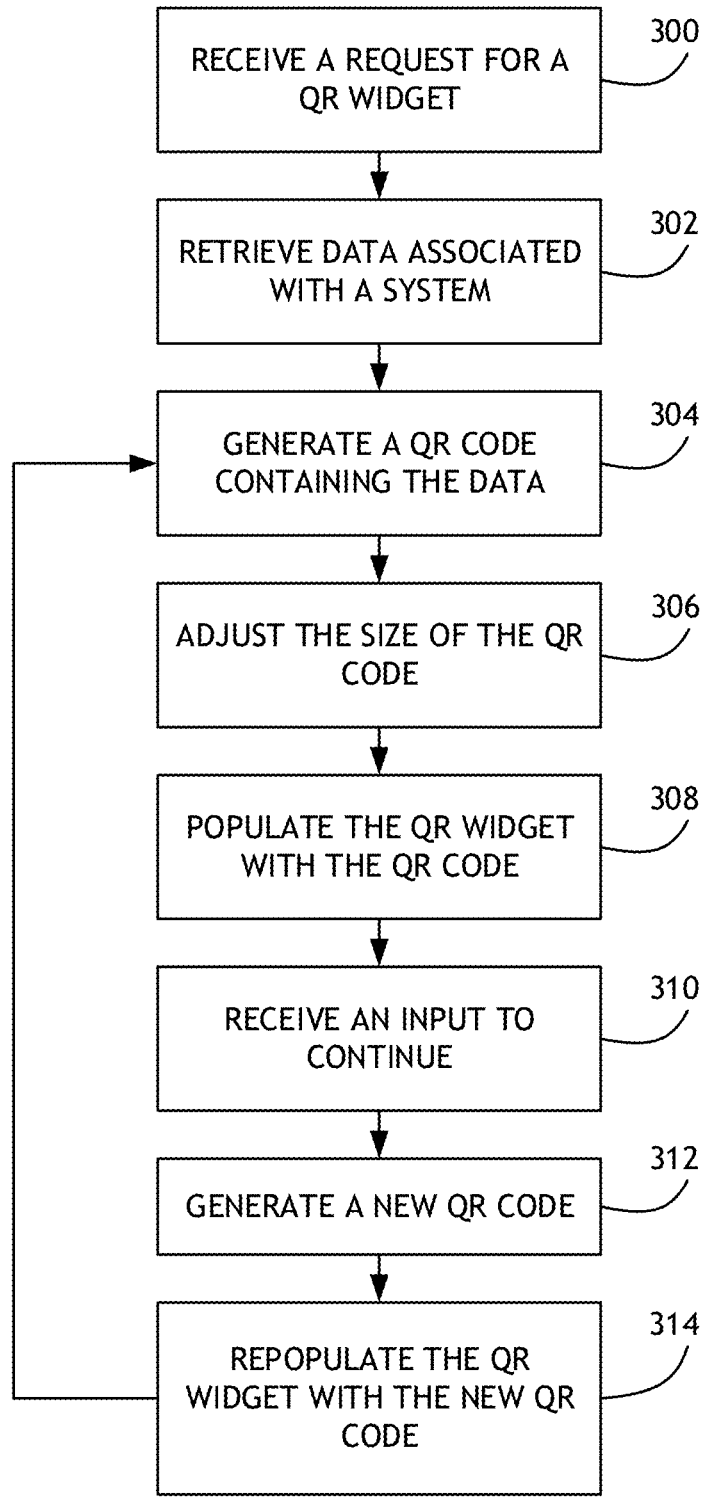
FIG. 3 shows a flowchart of a method for displaying data in an avionics display according to an exemplary embodiment of the inventive concepts disclosed herein.

Referring to FIG. 3, a flowchart of a method for displaying data in an avionics display according to an exemplary embodiment of the inventive concepts disclosed herein is shown. In at least one embodiment, at a step 300, a graphics server receives a request to generate a QR code with data corresponding to a system; for example, data associated with an error event. Such request may be issued by a user, or issued automatically by a system when an error event occurs or an error code is generated.

At a step 302, data associated with the system is retrieved from a data storage element and at a step 304, a QR code is generated representing the data. QR codes may take several forms of increasing complexity and data density. Embodiments of the inventive concepts disclosed herein are generally directed to a system wherein a handheld device records the QR code in an environment where interference may be common. In at a step 306, the size and complexity of the QR code may be adjusted to facilitate recording the QR code with the handheld device. The QR code widget may include an input to cycle the QR code through defined levels of complexity such that a user may select the most information dense QR code that may still be recordable via the handheld device.

At a step 308, the QR code widget is instantiated on a display device and populated with the QR code. A user may record the QR code with a handheld device. At a step 310, where more than one QR code worth of data is available, the QR code widget may include an input for indicating that the current QR code has been recorded. In such embodiment, the QR code may include only a portion of the available data defined by the data density of the QR code. At a step 312, upon indicating that the QR code has been recorded, such as through a selectable input or a photo sensor detecting a flash from handheld device, a new QR code is generated with a subsequent data set, and at a step 314, the new QR code widget is repopulated with the new QR code. The process continues until the desired data has been delivered via QR codes. Once the last QR code has been recorded, the QR code widget may be depopulated and removed from the display.

Figure 4:
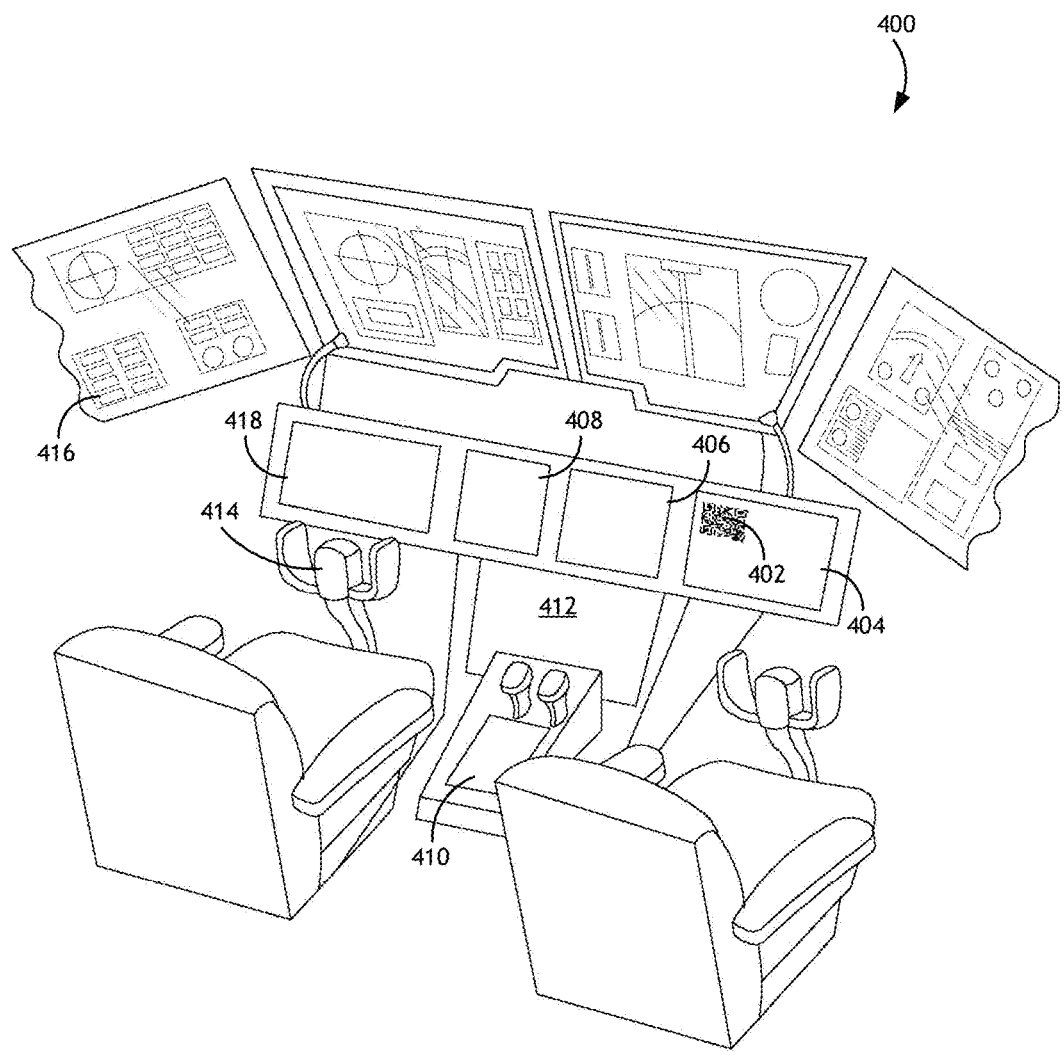
FIG. 4 shows an environmental view of a cockpit including an avionics system according to exemplary embodiments of the inventive concepts disclosed herein.

Referring to FIG. 4, an environmental view of a cockpit 400 including an avionics system according to exemplary embodiments of the inventive concepts disclosed herein is shown. An avionics system in an aircraft includes one or more display devices 404, 406, 408, 410, 412, 414, 416, 418, including non-integrated portable devices in data communication with the avionics system. Each of the one or more display devices 404, 406, 408, 410, 412, 414, 416, 418 may render a QR code or QR code widget 402 including system state data or error data according to the methods described herein. Each display device 404, 406, 408, 410, 412, 414, 416, 418 may render a QR code or QR code widget 402 encoding data specific to the corresponding device or subsystem, or the displays devices 404, 406, 408, 410, 412, 414, 416, 418 may define a specific area for rendering QR code or QR code widgets 402 common to all devices or subsystems. Furthermore, the QR code or QR code widget 402 may be repositionable so as to not interfere with continued operation of the aircraft.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
   a display;
   a photo sensor;
   at least one processor in data communication with the display, the photo sensor, and with a memory storing processor executable code for configuring the at least one processor to:
      retrieve state data associated with a system;
      divide the state data into chunks based on a data density of the QR code;
      generate a plurality of quick response (QR) codes, each including at least a chunk of the state data; and
      iteratively render the QR codes on the display, each iteration triggered via a light signal received from a hand-held device by the photo sensor.

2. The computer apparatus of claim 1, wherein the processor executable code further configures the at least one processor to receive an error code, and wherein retrieving the state data is triggered automatically based on receiving the error code.

3. The computer apparatus of claim 1, wherein the iterations are separated by a configurable delay period.

4. The computer apparatus of claim 1, wherein the processor executable code further configures the at least one processor to compress the state data before generating the QR code.

5. The computer apparatus of claim 1, wherein the processor executable code further configures the at least one processor to adjust a data density of the QR code.

6. A method comprising:
   retrieving an error code associated with a system;
   automatically retrieving state data associated with the system and error code;
   dividing the state data into chunks based on a data density of the QR code;
   generating a plurality of quick response (QR) codes, each including at least a chunk of the state data; and
   iteratively rendering the QR codes on a display, each iteration triggered via a light signal received from a hand-held device by a photo sensor.

7. The method of claim 6, wherein the iterations are separated by a predetermined period.

8. The method of claim 6, further comprising encrypting the state data before generating the QR code.

9. The method of claim 6, further comprising compressing the state data before generating the QR code.

10. The method of claim 6, further comprising adjusting a data density of the QR code.

11. An avionics system comprising:
    at least one processor in data communication with a memory storing processor executable code;
    at least one photo sensor in data communication with the at least one processor;
    a graphics server in data communication with the at least one processor; and
    a display in data communication with the at least one processor and the graphics server,
    wherein:
       the processor executable code configures the at least one processor to:
          send a request for a quick response (QR) code widget to the graphics server; and
          retrieve state data associated with the avionics system and send it to the graphics server; and
       the graphics server is configured to:
          receive the request for the QR code widget;
          generate the QR code widget;
          receive the state data;
          divide the state data into chunks based on a data density of the QR code;
          generate a plurality of QR codes, each including at least a chunk of the state data;
          iteratively populate the QR code widget with the QR codes, each iteration triggered via a light signal received from a hand-held device by a photo sensor; and
          render the QR code widget on the display.

12. The computer apparatus of claim 11, wherein the processor executable code further configures the at least one processor to encrypt the state data before sending it to the graphics server.

13. The computer apparatus of claim 11, wherein the processor executable code further configures the at least one processor to compress the state data before sending the state data to the graphics server.

14. The computer apparatus of claim 11, wherein the graphics server is further configured to:
    populate the QR code widget with an input to adjust a data density of a populated QR code; and
    adjust the data density of the QR code upon receiving a corresponding input.

* * * * *